United States Patent
Hara et al.

(10) Patent No.: US 9,246,579 B2
(45) Date of Patent: Jan. 26, 2016

(54) DEVICE INTERFACE APPARATUS, TEST APPARATUS, AND TEST METHOD

(71) Applicant: ADVANTEST CORPORATION, Tokyo (JP)

(72) Inventors: Hideo Hara, Miyagi (JP); Shin Masuda, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 70 days.

(21) Appl. No.: 14/328,715

(22) Filed: Jul. 11, 2014

(65) Prior Publication Data

US 2015/0016817 A1  Jan. 15, 2015

(30) Foreign Application Priority Data

Jul. 11, 2013  (JP) .................................. 2013-145445

(51) Int. Cl.
  *H04B 10/00*  (2013.01)
  *H04B 10/073*  (2013.01)
  *H04B 10/80*  (2013.01)

(52) U.S. Cl.
  CPC .......... *H04B 10/0731* (2013.01); *H04B 10/801* (2013.01)

(58) Field of Classification Search
  USPC ....................................................... 398/16–24
  See application file for complete search history.

(56) References Cited

U.S. PATENT DOCUMENTS

| | | | | |
|---|---|---|---|---|
| 4,808,815 A * | 2/1989 | Langley | ................ | G01J 1/0425 250/227.28 |
| 5,177,555 A * | 1/1993 | Stratton | ................ | G01R 31/043 250/227.19 |
| 5,432,878 A * | 7/1995 | Smous | .................. | G02B 6/4236 385/129 |
| 5,513,288 A * | 4/1996 | Mayer | ...................... | G02B 6/42 385/129 |
| 5,656,942 A * | 8/1997 | Watts | .................. | G01R 1/06705 324/750.19 |
| 5,897,728 A * | 4/1999 | Cole | ........................ | H01L 24/85 156/155 |
| 5,930,588 A * | 7/1999 | Paniccia | ............. | G01N 21/9501 257/E21.53 |
| 6,049,639 A * | 4/2000 | Paniccia | ................... | G02B 6/43 385/14 |
| 6,052,197 A * | 4/2000 | Drake | ...................... | G01D 5/30 356/445 |
| 6,384,612 B2 * | 5/2002 | Freund | ...................... | G01J 1/04 324/754.23 |
| 6,429,671 B1 * | 8/2002 | Duckworth | ........ | G01R 1/07378 324/750.23 |

(Continued)

FOREIGN PATENT DOCUMENTS

| | | |
|---|---|---|
| JP | 2001-108863 A | 4/2001 |
| JP | 2012-037350 A | 2/2012 |
| WO | 2007/013128 A1 | 2/2007 |

OTHER PUBLICATIONS

Office Action issued for counterpart Korean Application 10-2014-0087225, issued by Korean Intellectual Property Office on Jun. 22, 2015.

(Continued)

*Primary Examiner* — Agustin Bello

(57) ABSTRACT

A test apparatus that easily tests a device under test having an optical interface. Provided is a test method, a test apparatus, and a device interface apparatus on which is mounted a device under test having an optical interface, the device interface apparatus comprising a device mounting section on which the device under test is mounted; an optical connector that is connected to the optical interface of the device under test; and an optical signal detecting section that detects an optical signal output from at least one of the optical interface and the optical connector, before the optical interface of the device under test mounted on the device mounting section is connected to the optical connector.

17 Claims, 13 Drawing Sheets

(56) References Cited

U.S. PATENT DOCUMENTS

| | | | | |
|---|---|---|---|---|
| 6,448,805 B1* | 9/2002 | Heald | | H01S 5/0201 324/750.19 |
| 7,348,786 B2* | 3/2008 | Thacker | | G01R 31/311 324/755.07 |
| 7,554,347 B2* | 6/2009 | Mule' | | G01R 31/311 324/756.03 |
| 7,586,608 B1* | 9/2009 | Gunn, III | | G02B 6/12007 250/559.4 |
| 7,872,482 B2* | 1/2011 | Chong | | G01R 31/2889 324/754.07 |
| 7,884,634 B2* | 2/2011 | Chong | | G01R 31/2889 324/762.02 |
| 7,977,957 B2* | 7/2011 | Bohm | | G01R 1/06794 324/750.16 |
| 8,138,778 B1* | 3/2012 | Smith | | G01R 31/2808 324/756.02 |
| 8,457,450 B2* | 6/2013 | Kim | | G02B 6/43 385/130 |
| 8,712,252 B2* | 4/2014 | Masuda | | G01R 31/31709 356/73.1 |
| 8,792,792 B2* | 7/2014 | Masuda | | H01S 5/06821 359/237 |
| 8,885,157 B2* | 11/2014 | Masuda | | G01R 31/2886 324/501 |
| 8,907,696 B2* | 12/2014 | Masuda | | G01R 31/31917 324/750.23 |
| 9,151,797 B2* | 10/2015 | Richmond, II | | G01R 31/2868 |
| 2008/0118202 A1 | 5/2008 | Kato et al. | | |
| 2012/0033208 A1 | 2/2012 | Hara et al. | | |
| 2012/0177363 A1* | 7/2012 | Masuda | | G01R 31/31709 398/16 |
| 2012/0269521 A1* | 10/2012 | Masuda | | H01S 5/06821 398/182 |
| 2015/0016817 A1* | 1/2015 | Hara | | H04B 10/801 398/16 |

OTHER PUBLICATIONS

Office Action issued for counterpart Japanese Application 2013-145445, issued by Japan Patent Office on Sep. 8, 2015.

* cited by examiner

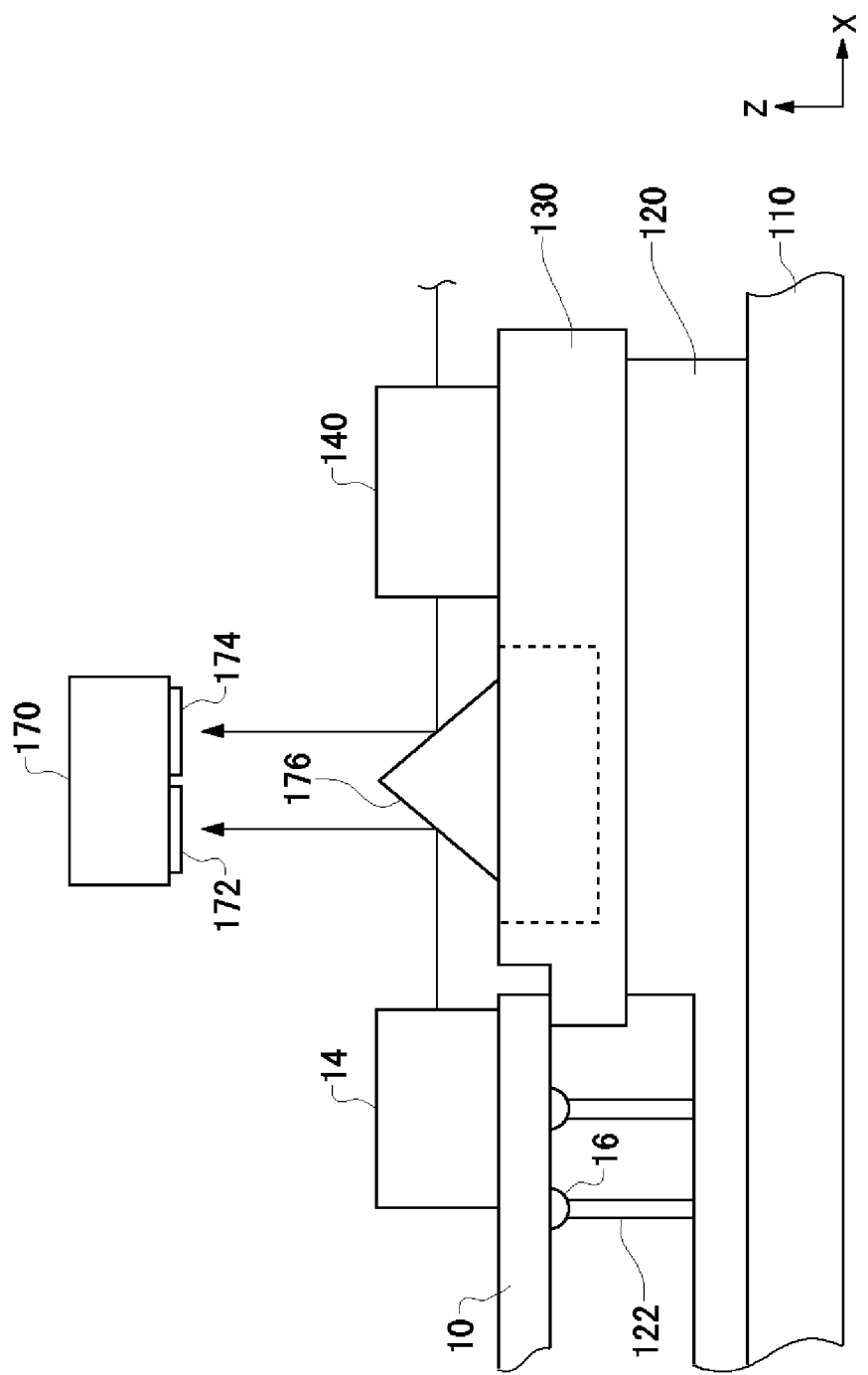

DEVICE INTERFACE APPARATUS, TEST APPARATUS, AND TEST METHOD

BACKGROUND

1. Technical Field

The present invention relates to a device interface apparatus, a test apparatus, and a test method.

2. Related Art

A conventional test apparatus tests a device under test such as a CPU or memory. A proposal has been made to include an optical interface in the device under test, as shown in Patent Document 1, for example.

Patent Document 1: International Publication WO 2007-013128

When testing a module under test or a device under test including an optical interface, the test apparatus establishes an optical connection with the device under test and uses an optical signal as the test signal that is input into an optical input section of the device under test, and the test apparatus must also be able to detect the optical response signal output from an optical output section of the device under test. It has been difficult for the test apparatus to perform the optical connection with a device under test that includes an optical interface. Furthermore, when the optical signal cannot be obtained from the device under test by the test apparatus, it has been difficult to determine whether the device under test has been damaged or whether there is a problem in the optical connection.

SUMMARY

Therefore, it is an object of an aspect of the innovations herein to provide a device interface apparatus, a test apparatus, and a test method, which are capable of overcoming the above drawbacks accompanying the related art. The above and other objects can be achieved by combinations described in the claims. According to a first aspect of the present invention, provided is a test method, a test apparatus, and a device interface apparatus on which is mounted a device under test having an optical interface, the device interface apparatus comprising a device mounting section on which the device under test is mounted; an optical connector that is connected to the optical interface of the device under test; and an optical signal detecting section that detects an optical signal output from at least one of the optical interface and the optical connector, before the optical interface of the device under test mounted on the device mounting section is connected to the optical connector.

The summary clause does not necessarily describe all necessary features of the embodiments of the present invention. The present invention may also be a sub-combination of the features described above.

BRIEF DESCRIPTION OF THE DRAWINGS

FIG. 16 shows a modification of the optical signal detecting section 170 according to the present embodiment.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
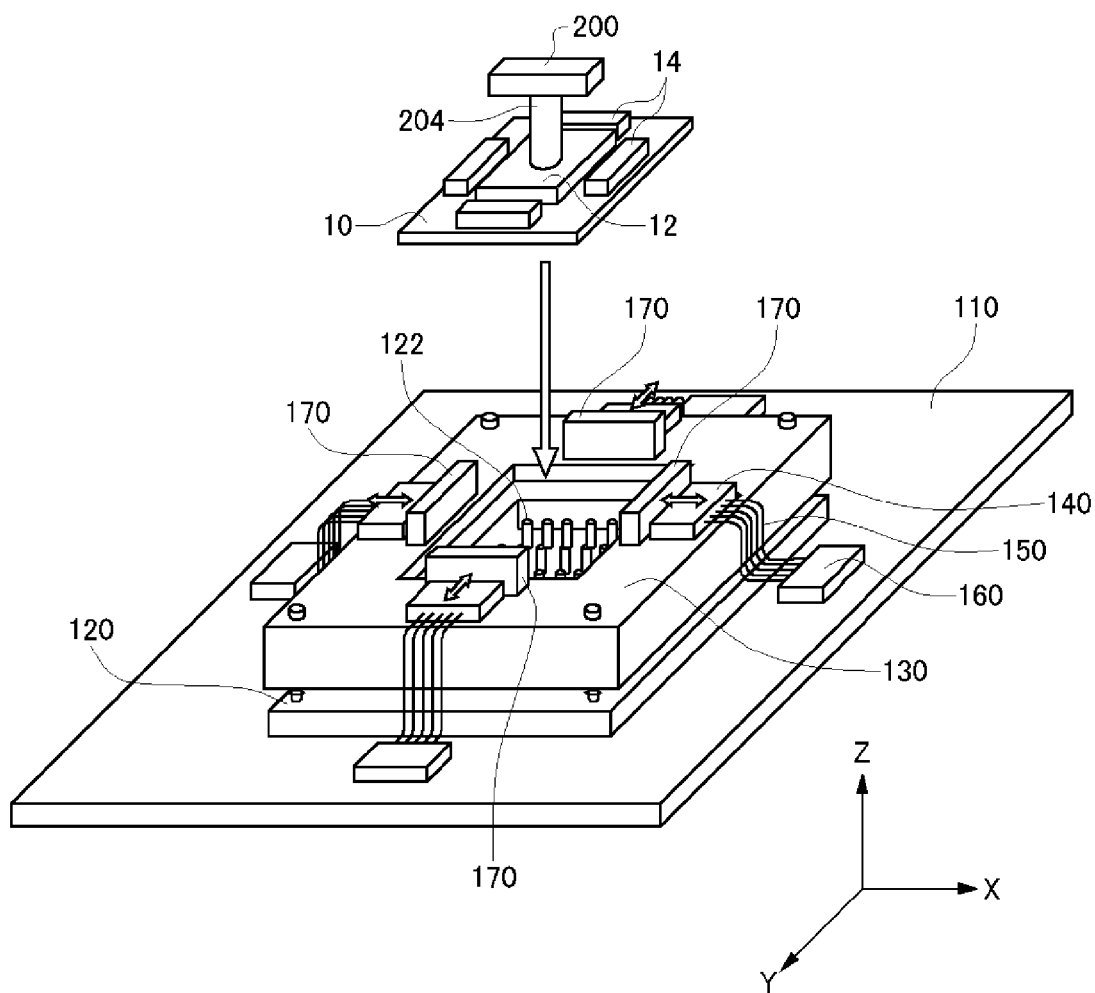
FIG. 1 shows an exemplary configuration of a device interface apparatus 100 according to an embodiment of the present invention, along with a module under test 10.
Figure 2:
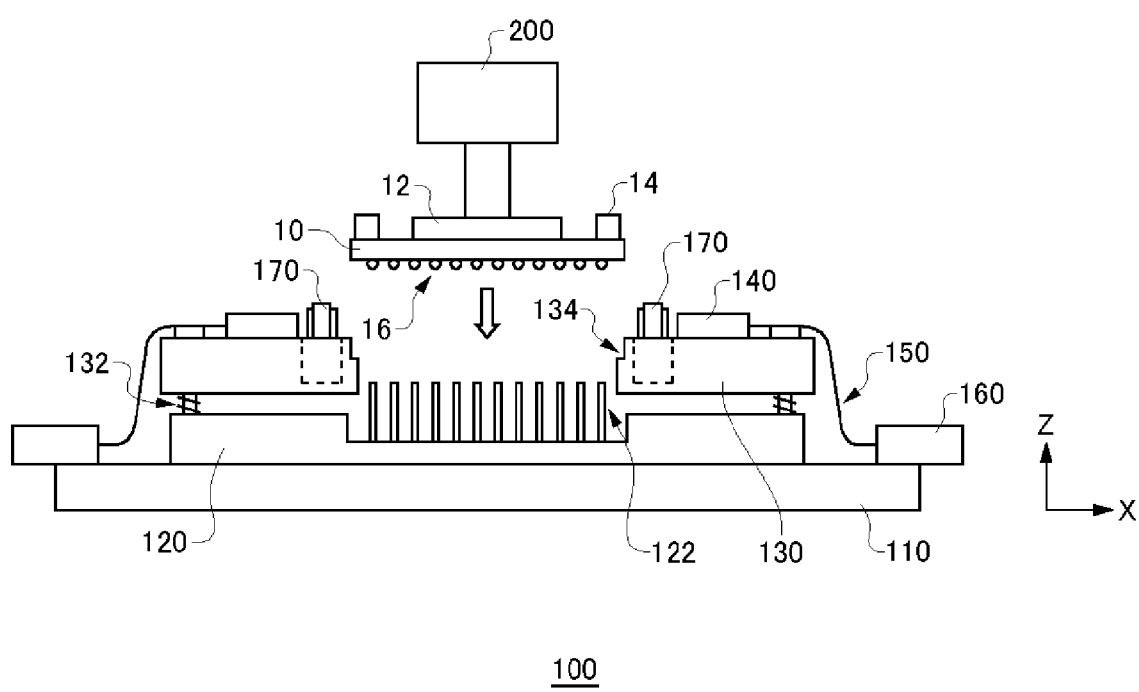
FIG. 2 shows an exemplary cross section of the device interface apparatus 100 according to the present embodiment, along with the module under test 10.

FIG. 1 shows an exemplary configuration of a device interface apparatus 100 according to an embodiment of the present invention, along with a module under test 10. FIG. 2 shows an exemplary cross section of the device interface apparatus 100 according to the present embodiment, along with the module under test 10. The device interface apparatus 100 has a module under test or a device under test including an optical interface mounted thereon, and establishes an optical connection between the device under test and a test apparatus. Before establishing the optical connection with the device under test or the module under test, the device interface apparatus 100 determines whether the device under test or the like and/or test apparatus are capable of outputting an optical signal, and determines whether to continue testing based on the result.

If the device under test or the like further includes an electric interface for exchanging electrical signals, the device interface apparatus 100 establishes both an electrical connection and an optical connection with the device under test or module under test. Here, a combination of the device under test, the optical interface, and the electrical interface may be referred to as a device under test, but in the present embodiment, this is referred to as a module under test 10 to be distinguished from a single device under test.

The present embodiment describes an example in which the device interface apparatus 100 forms an optical connection and an electrical connection with a module under test 10 that includes an optical interface and an electrical interface. The module under test 10 includes one or more devices under test 12, one or more optical interfaces 14, and one or more device-side electrical terminals 16.

The device under test 12 includes an analog circuit, a digital circuit, a memory, and/or a system on chip (SOC), for example, and has an optical input/output section for exchanging optical signals with the optical interface 14. Instead, the device under test 12 may receive an electrical signal obtained by converting the optical signal to an electrical signal within the module under test 10, and may output an electrical signal that is to be converted into an optical signal within the module under test 10.

The optical interface 14 is oriented facing toward the side surface of the module under test 10, for example. A plurality of the optical interfaces 14 may be arranged on the module under test 10, in which case each of the optical interfaces 14 is arranged facing in the direction of a different side surface.

The optical interface 14 may include a connector that connects one or more optical signals through engagement. The optical interface 14 is a connector formed by arranging optical fiber with one end exposed, for example. Instead, the optical interface 14 may be an optical fiber compliant with any one of MY, MPO, LC, MU, SC, ST, or FC types. In the present embodiment, the module under test 10 includes a plurality of optical interfaces 14.

The device-side electrical terminal 16 exchanges electrical signals with the outside of the module under test 10. The device-side electrical terminal 16 may be a BGA (Ball Grid Array) in which a plurality of solder bumps are arranged in an array, or may be an LGA (Land Grid Array) in which a plurality of flat electrode pads are arranged in an array. The device-side electrical terminal 16 may be one or more solder bumps, one or more lands, and/or a connector, for example. The device-side electrical terminal 16 may be one or more input terminals and one or more output terminals that exchange electrical signals, and/or one or more input/output terminals.

In order to exchange optical signals and electrical signals with the module under test 10 described above, the module under test 10 is mounted on the device interface apparatus 100. The device interface apparatus 100 includes a substrate 110, a socket section 120, a device mounting section 130, an optical connector 140, an optical transmission path 150, an optical port 160, an optical signal detecting section 170, and a handler apparatus 200.

The substrate 110 is a performance board that is connected to the test apparatus, supplies the module under test or device under test with a test signal from the test apparatus, receives a response signal output in response to the supplied test apparatus, and supplies this response signal to the test apparatus, for example. A substrate 110 may be formed for each different operating speed, shape, number of pins, and pin shape of the module under test 10, shape of the optical connector, and/or testing item. Instead, the substrate 110 may be an interface board of the module under test 10. FIGS. 1 and 2 show an example in which one module under test 10 is mounted on the substrate 110.

The socket section 120 is provided on the top surface of the substrate 110, and is electrically connected to the module under test 10. The socket section 120 transfers the electrical signal transmitted from the substrate 110 to the module under test 10, and transfers the electrical signal transmitted from the module under test 10 to the substrate 110. The socket section 120 includes a socket-side electrical terminal 122 connected to the device-side electrical terminal 16 of the module under test 10.

The socket-side electrical terminals 122 provided to the socket section 120 in advance have shapes, types, and/or number of terminals needed to electrically connect to the module under test 10, according to the shape, type, and number of the device-side electrical terminals 16 of the module under test 10. The socket-side electrical terminal 122 may be a terminal, probe, cantilever, or membrane bump that directly contacts the device-side electrical terminal 16.

If the device-side electrical terminal 16 is a connector, the socket-side electrical terminal 122 may be a connector that fits with the device-side electrical terminal 16. The socket section 120 may have a number of socket-side electrical terminals 122 that is greater than or equal to the number of device-side electrical terminals 16 of the module under test 10, for example.

The module under test 10 is mounted on the device mounting section 130. The device mounting section 130 is provided to be movable relative to the socket section 120, is pressed against the socket section 120, and electrically connects the socket section 120 and the module under test 10 mounted thereon. The device mounting section 130 may include a spring mechanism 132. The spring mechanism 132 is provided between the device mounting section 130 and the socket section 120. Due to the spring mechanism 132, the device mounting section 130 moves away from the socket section 120 when in a state of not being pressed toward the socket section 120, and moves toward the socket section 120 when being pressed toward the socket section 120.

The optical connector 140 is connected to the optical interface 14 of the module under test 10, and exchanges optical signals with the optical interface 14. The optical connector 140 is provided to correspond to the optical interface 14 of the module under test 10, and in a case where the module under test 10 includes a plurality of optical interfaces 14, a plurality of optical connectors 140 are connected respectively to the plurality of optical interfaces 14.

In a case where the optical interface 14 includes a connector, the optical connector 140 may include a connector that engages with the connector of the optical interface 14. Instead, the optical connector 140 may be provided with an end surface of an optical fiber and exchange optical signals with the optical interface 14 via this end surface. The optical connector 140 may be optically connected in close contact with the optical interface 14. Instead, the optical connector 140 may include an optical system such as a lens.

The optical transmission path 150 has one end connected to the optical connector 140, and the other end is fixed to the substrate 110. The optical transmission path 150 may be a flexible transmission path, and may be an optical fiber, for example. The other end of the optical transmission path 150 may be connected to the optical port 160 fixed on the substrate 110.

The device interface apparatus 100 includes a plurality of optical transmission paths 150. A portion of the optical transmission paths 150 may transmit an optical test signal from the optical port 160 to the module under test 10, while another portion of the optical transmission paths 150 may transmit the optical signal output from the module under test 10 to the optical port 160. Instead of this or in addition to this, the device interface apparatus 100 may include one or more optical transmission paths 150 that exchange optical signals between the module under test 10 and the optical port 160.

The optical port 160 is fixed on the substrate 110. The optical port 160 may include a photoelectric convertor and/or an electro-optical converter therein. The optical port 160 may convert the electrical signal supplied from the substrate 110 into an optical signal through the electro-optical converter, and supply this optical signal to the optical transmission path 150. The optical port 160 may convert the optical signal transmitted from the optical transmission path 150 into an electrical signal using the internal photoelectric converter, and supply this electrical signal to the substrate 110.

Instead, the optical port 160 may supply the optical transmission path 150 with an optical signal converted by an external electro-optical converter provided farther from the module under test 10 than the optical port 160. The optical port 160 may transmit an optical signal transmitted from the optical transmission path 150 to an external photoelectric converter. Here, the external photoelectric converter and electro-optical converter are provided on a test board of the test apparatus, for example.

The optical signal detecting section 170 is provided to correspond to the optical interface 14 and/or the optical connector 140. The optical signal detecting section 170 detects the optical signal output from at least one of the optical interface 14 and the optical connector 140.

Before the optical connector 140 and the optical interface 14 of the module under test 10 mounted on the device mounting section 130 are connected, the optical signal detecting section 170 detects the optical signal output from at least one of the optical interface 14 and the optical connector 140. The optical signal detecting section 170 includes a photoelectric converter that converts an optical signal into an electrical signal, corresponding to at least one of the optical interface 14 and the optical connector 140.

In a case where the module under test 10 includes a plurality of optical interfaces 14, for example, a plurality of optical signal detecting sections 170 are provided to correspond respectively to the plurality of optical interfaces 14 and to detect each of the optical signals output by a plurality of optical interfaces 14. In a similar manner, in a case where the device interface apparatus 100 is provided with a plurality of optical connectors 140, a plurality of optical signal detecting sections 170 may be provided to correspond respectively to the optical connectors 140 and detect each of the optical signals output from the optical connectors 140.

Before the optical interface 14 is connected to the optical connector 140, the optical signal detecting section 170 is arranged between the optical interface 14 and the optical connector 140, for example. When the optical connector 140 and the optical interface 14 are connected, the optical signal detecting section 170 is arranged in a manner not to contact the optical interface 14 and the optical connector 140.

In other words, when detecting an optical signal, at least a portion of the optical signal detecting sections 170 move on the optical axis of the optical signal output from each of the optical interface 14 and the optical connectors 140, using a moving mechanism provided on the device interface apparatus 100. Furthermore, when the optical interface 14 and the optical connectors 140 are connected, at least a portion of the optical signal detecting sections 170 move away from the optical axis of the optical interface 14 and the optical connectors 140 using this moving mechanism.

The handler apparatus 200 transports the module under test 10 and mounts the module under test 10 on the device interface apparatus 100. The handler apparatus 200 may include a device adhering section 204 that adheres and fixes the module under test 10 thereto. The handler apparatus 200 adheres and fixes the module under test 10 thereto, mounts the module under test 10 on the device mounting section 130 of the device interface apparatus 100, and may then release the adhesion on the module under test 10. After the device interface apparatus 100 has finished positioning the module under test 10, the handler apparatus 200 may press the module under test 10 against the device interface apparatus 100.

Figure 3:
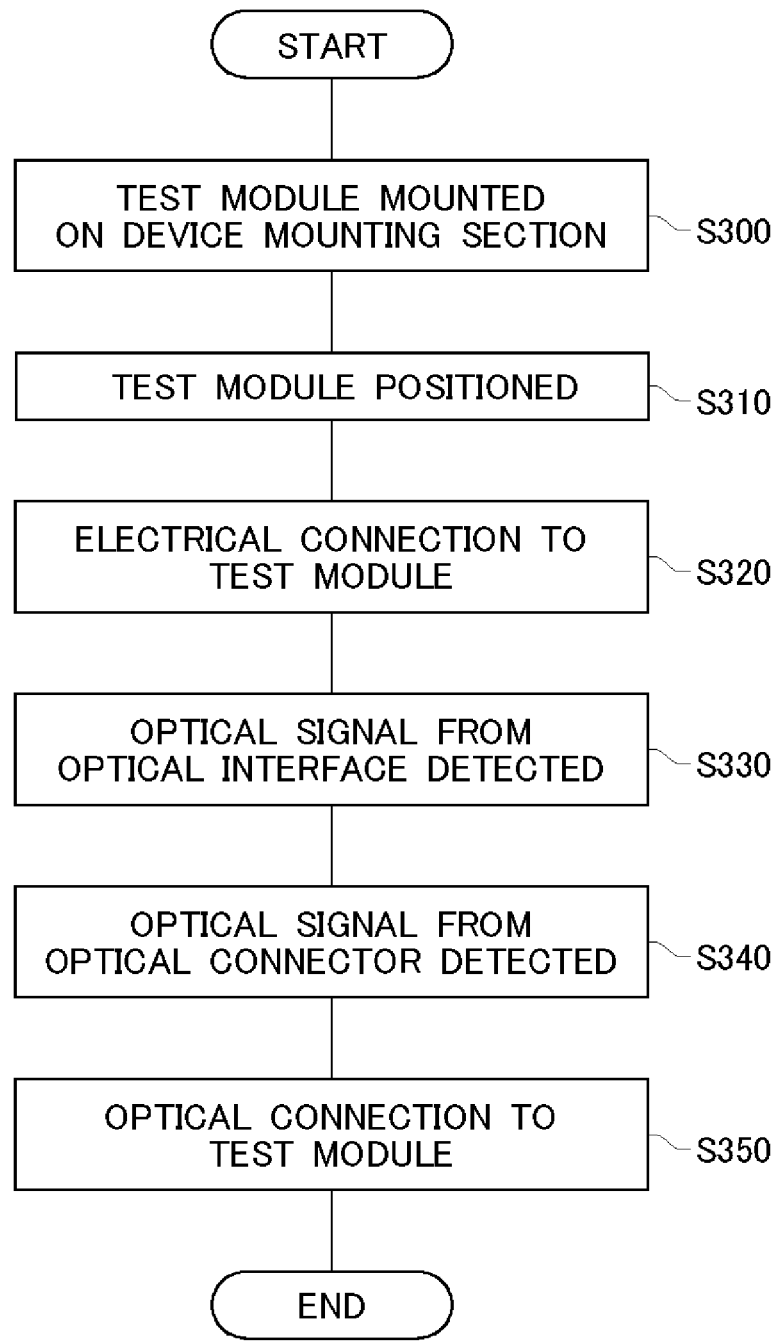
FIG. 3 shows a process flow of the device interface apparatus 100 according to the present embodiment.

FIG. 3 shows a process flow of the device interface apparatus 100 according to the present embodiment. The device interface apparatus 100 performs this process flow to sequentially perform the steps of mounting and positioning the module under test 10, electrically connecting to the module under test 10, checking operation of the module under test 10, checking operation of the test apparatus, and optically connecting to the module under test 10.

Figure 4:
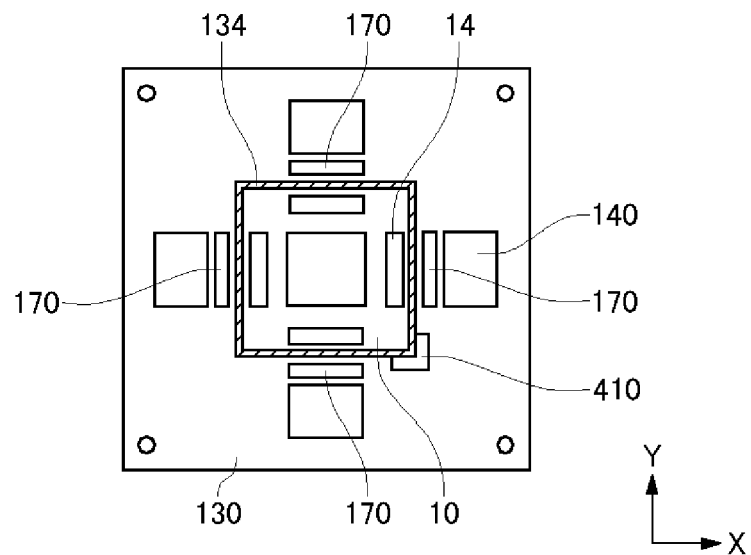
FIG. 4 shows an exemplary configuration of a top view of a stage at which the device mounting section 130 according to the present embodiment has the module under test 10 mounted thereon.

The device interface apparatus 100 transports the module under test 10 using the handler apparatus 200, and mounts the module under test 10 on the device mounting section 130 (S300). The handler apparatus 200 adheres and fixes the module under test 10 thereto using the device adhering section 204, for example, to transport the module under test 10. FIG. 4 shows an exemplary configuration of a top view of a stage at which the device mounting section 130 according to the present embodiment has the module under test 10 mounted thereon. Next, the handler apparatus 200 releases the adhesion of the device adhering section 204.

Figure 5:
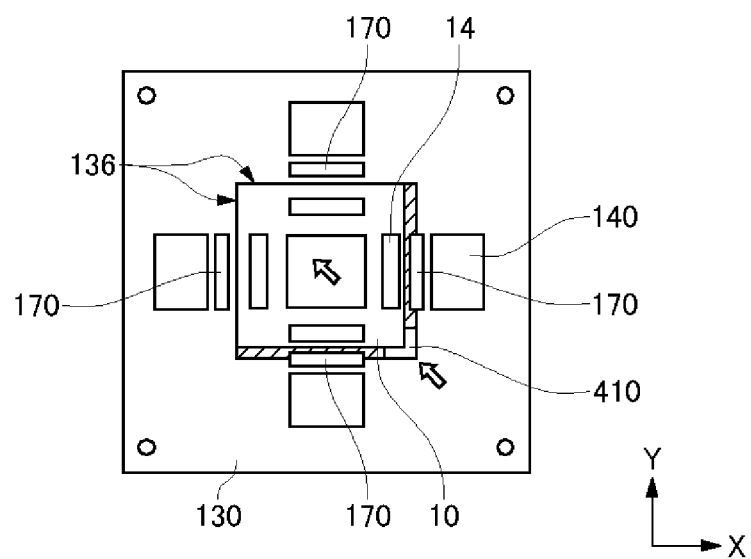
FIG. 5 shows an exemplary configuration of a top view of a stage at which the device mounting section 130 according to the present embodiment has positioned the module under test 10.

Next, the device interface apparatus 100 positions the module under test 10 (S310). The positioning of the module under test 10 is described using FIGS. 4 and 5. FIG. 5 shows an exemplary configuration of a top view of a stage at which the device mounting section 130 according to the present embodiment has positioned the module under test 10.

The device mounting section 130 includes a positioning section 410 that positions the module under test 10 relative to the device mounting section 130, before the device-side electrical terminal 16 and the socket-side electrical terminal 122 are brought into contact with each other. The positioning section 410 has a U-shaped or L-shaped cross section, for example, and positions and fixes the module under test 10 on the device mounting section 130 by pressing the module under test 10. The device mounting section 130 has an indentation 134, which contains at least a portion of the module under test 10 therein. For example, FIG. 4 shows a state in which the module under test 10 is placed in the indentation 134 of the device mounting section 130.

In this state, the positioning section 410 positions the module under test 10 relative to the device mounting section 130 by pressing the module under test 10 against the reference surface 136 provided on a sidewall within the indentation 134. For example, in FIG. 5, among the four sidewalls of the indentation 134 facing the module under test 10, which are facing up, down, left, and right, i.e. the positive direction on the Y axis, the negative direction on the Y axis, the negative direction on the X axis, and the positive direction on the X axis, the device mounting section 130 has reference surfaces 136 on the upward facing sidewall, i.e. the sidewall facing in the positive direction on the Y axis, and the leftward facing sidewall, i.e. the sidewall facing the negative direction on the X axis.

Figure 6:
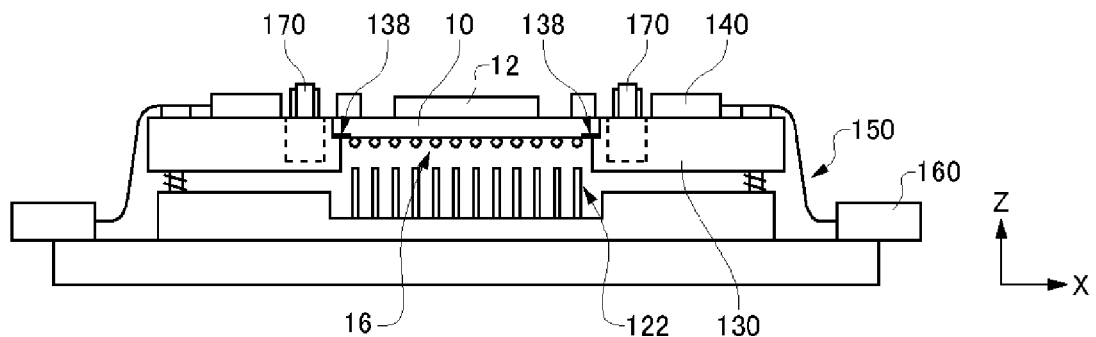
FIG. 6 shows an exemplary configuration of a cross-sectional view of a stage at which the device mounting section 130 according to the present embodiment has positioned the module under test 10.

The positioning section 410 is driven by electrical power, magnetic force, gas pressure, or the like to press the module under test 10 in the direction indicated by the arrows in the drawing, thereby pressing the module under test 10 against the two reference surfaces 136 and positioning the module under test 10. FIG. 6 shows an exemplary configuration of a cross-sectional view of a stage at which the device mounting section 130 according to the present embodiment has positioned the module under test 10.

The positioning section 410 may position the module under test 10 by pressing the module under test 10 against a Z-direction reference surface 138, such that the module under test 10 is arranged parallel to the XY plane. Instead of this, the handler apparatus 200 may press the module under test 10 toward the device interface apparatus 100. In a state where the positioning section 410 has positioned and fixed the module under test 10, the device interface apparatus 100 arranges the module under test 10 and each component such that the device-side electrical terminals 16 of the module under test 10 are opposite the corresponding socket-side electrical terminals 122.

Figure 7:
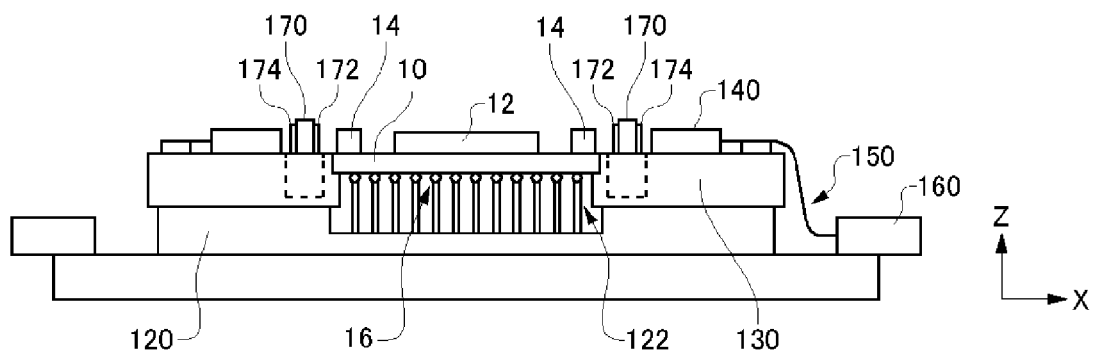
FIG. 7 shows an exemplary configuration of a stage at which the device interface apparatus 100 according to the present embodiment is electrically connected to the module under test 10.

Next, the device interface apparatus 100 electrically connects to the module under test 10 (S320). In other words, with the module under test 10 in a positioned state, the device mounting section 130 is pressed toward the socket section 120. The device-side electrical terminals 16 of the module under test 10 mounted on the pressed device mounting section 130 electrically connect to the corresponding socket-side electrical terminals 122. FIG. 7 shows an exemplary configuration of a stage at which the device interface apparatus 100 according to the present embodiment is electrically connected to the module under test 10.

The device mounting section 130 includes a mechanism for moving up and down while holding the module under test 10 to form a connection between the device-side electrical terminals 16 and the corresponding socket-side electrical terminals 122, for example. Here, the handler apparatus 200 again uses the device adhering section 204 to adhere and fix the module under test 10 thereto, and may press the module under test 10 toward the socket section 120. Instead, the handler apparatus 200 may include a pressing section that directly contacts the device mounting section 130 and presses the device mounting section 130 toward the socket section 120.

After electrically connecting to the module under test 10, the device interface apparatus 100 supplies the module under test 10 with power and/or electrical signals, for example. The device interface apparatus 100 may supply electrical signals of a predetermined voltage and detect whether the value of the flowing current is within a prescribed current value range, to confirm the electrical connection with the module under test 10.

If the value of the current flowing through the module under test 10 is outside this predetermined current value range, the device interface apparatus 100 may separate the module under test 10 from the device mounting section 130 and then perform the steps from S300 again to remount on the device mounting section 130. If the electrical connection cannot be confirmed even after a predetermined number of repetitions of the process flow from step S300 of mounting on the device mounting section 130, the device interface apparatus 100 may determine that the electrical interface of the module under test 10 is defective and suspend this process flow.

After a successful electrical connection with the module under test 10 has been confirmed, the device interface apparatus 100 supplies the module under test 10 with power and/or electrical signals causing optical signals to be output from the optical interface 14. In this way, before optically connecting to the module under test 10, the device interface apparatus 100 can cause optical signals to be output from the optical interface 14 of the module under test 10 by establishing an electrical connection.

Figure 8:
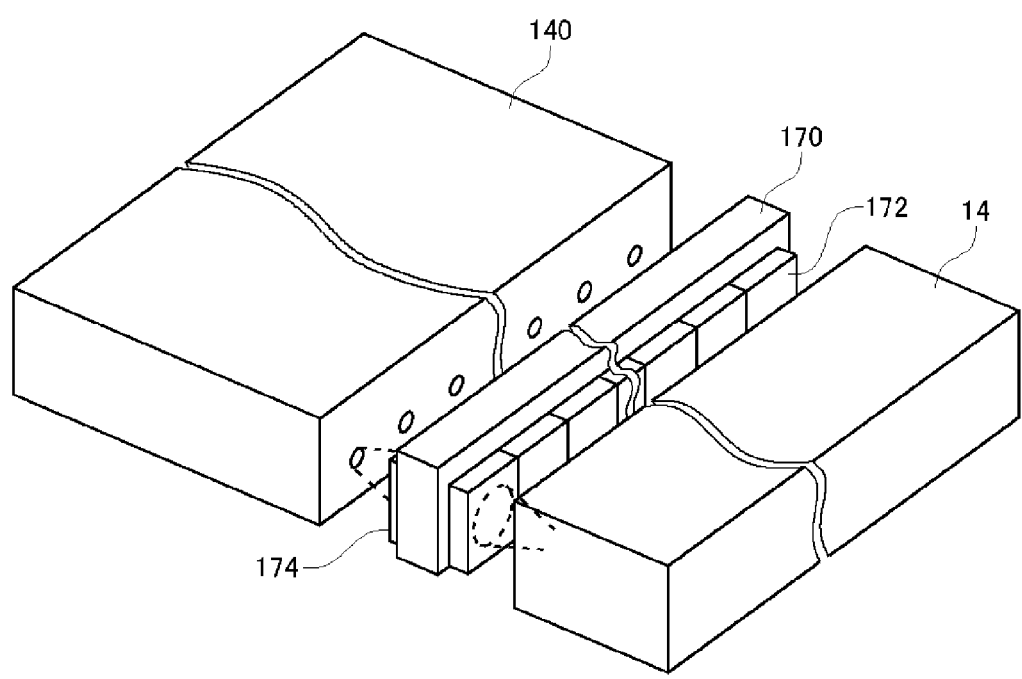
FIG. 8 shows an exemplary configuration of the optical signal detecting section 170 according to the present embodiment, along with the optical interface 14.

Next, the optical signal detecting section 170 detects the optical signal from the optical interface 14 of the module under test 10 (S330). The optical signal detecting section 170 is arranged on the optical axis of the optical signal output from the optical interface 14, and receives and detects the optical signal. FIG. 8 shows an exemplary configuration of the optical signal detecting section 170 according to the present embodiment, along with the optical interface 14. The optical signal detecting section 170 includes a photoelectric converter 172 corresponding to the optical interface 14.

Specifically, a first surface of the optical signal detecting section 170 faces the emission surface from which the optical interface 14 outputs one or more optical signals, and one or more photoelectric converters 172 that convert the one or more optical signals output by the optical interface 14 into one or more electrical signals are provided on the first surface. In a case where the optical interface 14 outputs a plurality of optical signals, the corresponding optical signal detecting section 170 includes a plurality of photoelectric converters 172 that convert the plurality of optical signals into respective electrical signals. FIG. 8 shows an example in which the optical signal detecting section 170 includes a plurality of photoelectric converters 172 corresponding respectively to the plurality of optical signals output by the optical interface 14.

The optical signal detecting section 170 is arranged near the optical interface 14, such that the spot size of the optical signal received by each photoelectric converter 172 is less than the light receiving surface area of the photoelectric converter 172. Instead, the optical signal detecting section 170 may further include an optical system such as a lens on the optical axes of the received optical signals.

The device interface apparatus 100 causes optical signals to be output from the optical interface 14, detects the optical signals with the corresponding photoelectric converters 172, and confirms the optical output operation of the module under test 10. For example, the optical signal detecting section 170 determines whether each optical signal received by a photoelectric converter 172 is emitted correctly, according to whether the electrical signal resulting from the conversion by the photoelectric converter 172 is within a predetermined voltage value range and/or current value range.

If it is determined that the optical signal output of the optical interface 14 is defective, the device interface apparatus 100 may again perform the process flow from step S300 of mounting the module under test 10. If the optical signal output cannot be confirmed even after a predetermined number of repetitions of the process flow from step S300 of mounting on the device mounting section 130, the device interface apparatus 100 may determine that the optical interface 14 of the module under test 10 is defective and suspend this process flow.

In a case where the optical interface 14 includes a plurality of output sections for outputting optical signals, the device interface apparatus 100 checks the optical output operation by using a plurality of photoelectric converters 172 corresponding to the plurality of output sections for detection. In this case, the device interface apparatus 100 may sequentially check the optical signals output one section at a time, by causing the optical signals output by the optical interface 14 to be output one at a time. Instead, the device interface apparatus 100 may cause the optical signals output by the optical interface 14 to be emitted simultaneously, in order to perform simultaneous testing.

Next, the optical signal detecting section 170 detects the optical signal from the optical connector 140 (S340). The optical signal detecting section 170 is arranged between the optical interface 14 and the optical connector 140, and receives and detects the optical signal output from the side of the optical connector 140 opposite the optical interface 14. The optical signal detecting section 170 includes a photoelectric converter that is arranged on the optical axis of the optical signal output from the optical connector 140 and corresponds to the optical connector 140.

The photoelectric converter corresponding to the optical connector 140 may be formed integrally with the photoelectric converter 172 corresponding to the optical interface 14 to form the optical signal detecting section 170, or may be a separate component. FIG. 8 shows an exemplary configuration in which the photoelectric converter 172 corresponding to the optical interface 14 and the photoelectric converter 174 corresponding to the optical connector 140 are formed integrally with the optical signal detecting section 170.

Specifically, the optical signal detecting section 170 has a second surface that faces the emission surface of the optical connector 140 that outputs one or more optical signals, and one or more photoelectric converters 174 that convert the one or more optical signals output by the optical connector 140 into one or more electrical signals are provided on the second surface. In FIG. 8, the front surface of the optical signal detecting section is the first surface, and the second surface is the back surface, which is on the opposite side of the front surface. Here, in a case where the optical connector 140 outputs a plurality of optical signals, the corresponding optical signal detecting section 170 includes a plurality of photoelectric converters 174 that convert the plurality of optical signals respectively into a plurality of electrical signals.

The optical signal detecting section 170 is arranged near the optical connector 140 such that the spot size of each optical signal received by a photoelectric converter 174 is less than the light receiving surface area of the photoelectric converter 174. Instead, the optical signal detecting section 170 may further include an optical system such as a lens arranged on the optical axes of the received optical signals.

The device interface apparatus 100 detects the optical signals output from the optical connector 140 using the corresponding photoelectric converters 174, and confirms the light output operation of the optical connector 140. For example, the optical signal detecting section 170 determines whether each optical signal received by a photoelectric converter 174 is emitted correctly, according to whether the electrical signal resulting from the conversion by the photoelectric converter 174 is within a predetermined voltage value range and/or current value range.

If the optical signal output from the optical connector 140 cannot be confirmed, the device interface apparatus 100 may determine that the light emission end surface of the optical connector 140 is dirty and/or degraded, and suspend the process flow. In this way, a user can know the timing for washing or exchanging the optical connector 140.

In a case where the optical connector 140 includes a plurality of output sections for outputting optical signals, the device interface apparatus 100 checks the optical output operation by using a plurality of photoelectric converters 174 corresponding to the plurality of output sections for detection. In this case, the device interface apparatus 100 may sequentially check the optical signals output one section at a time, by causing the optical signals output by the optical connector 140 to be output one at a time. Instead, the device interface apparatus 100 may cause the optical signals output by the optical connector 140 to be emitted simultaneously, in order to perform simultaneous checking of the optical signals.

In the manner described above, the optical signal detecting section 170 detects the optical signals output from at least one of the optical connector 140 and the optical interface 14. Furthermore, by including photoelectric converters on different surfaces, the optical signal detecting section 170 can detect each optical signal output by the corresponding optical interface 14 and optical connector 140.

As shown in FIG. 8, when at least some of the optical signal detecting sections 170 detect an optical signal, these optical signal detecting sections 170 are arranged on the optical axis of the optical signal output from at least one of the optical interface 14 and the optical connector 140. Specifically, the device interface apparatus 100 includes a moving section that moves photoelectric converters on the optical axes of the corresponding optical signals, so that an optical signal detecting section 170 detects the optical signals output from at least one of the optical interface 14 and the optical connector 140.

Specifically, FIG. 8 shows an example of a state after the corresponding photoelectric converters have been moved on the axes of the optical signals by the moving section. Here, in a case where the device interface apparatus 100 includes a plurality of optical signal detecting sections 170, the moving section moves each of the optical signal detecting sections 170 between the corresponding optical interface 14 and the corresponding optical connector 140.

Next, the optical connector 140 and the optical interface 14 of the module under test 10 are optically connected (S350). When connecting the optical interface 14 and the optical connector 140, the moving section moves the photoelectric converters away from the optical axis of the optical interface 14. The device interface apparatus 100 then moves the optical connector 140 to connect the optical interface 14 and the optical connector 140.

Figure 9:
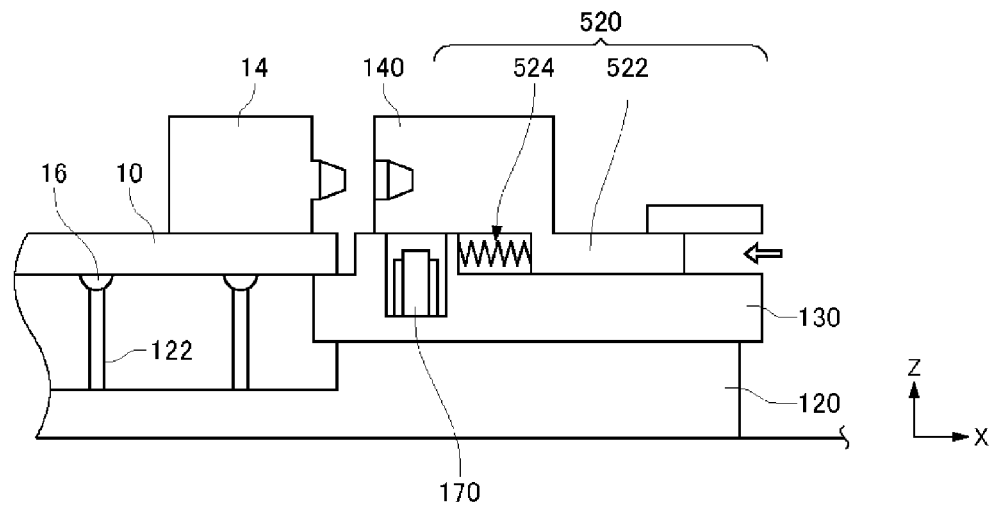
FIG. 9 shows an exemplary configuration of a partial cross section of the device interface apparatus 100 according to the present embodiment, along with the module under test 10.

The device interface apparatus 100 includes an optical connector moving section that moves the optical connector 140 toward the optical interface 14 to connect the optical interface 14 and the optical connector 140, for example. FIG. 9 shows an exemplary configuration of a partial cross section of the device interface apparatus 100 according to the present embodiment, along with the module under test 10. FIG. 9 shows an example in which the optical signal detecting section 170 is moved by the moving section and housed within the device mounting section 130.

The optical connector moving section 520 moves the optical connector 140 toward the optical interface 14 in a direction perpendicular to the side surface of the module under test 10, i.e. a direction parallel to the device mounting surface of the device mounting section 130. The optical connector moving section 520 includes a cylinder 522 and a elastic body 524.

The cylinder 522 moves the optical connector 140 in the direction of the optical interface 14 using hydraulic pressure received from the outside. The cylinder 522 may be a cylindrical component that contains a fluid, such as a gas or liquid. The cylinder 522 is pressed in a direction of the arrows shown in the drawing, by pressurized gas or the like introduced from the outside, and the optical connector 140 being connected and fixed to the cylinder 522 moves toward the optical interface 14. Instead, the cylinder 522 may move the optical connector 140 using electrical power or magnetic force, for example.

In a state where the cylinder 522 is not being pressed by compressed gas or the like, the elastic body 524 presses the cylinder 522 in a direction causing the optical connector 140 and the optical interface 14 to move away from each other. The elastic body 524 may be a spring, for example. In this way, when the cylinder 522 is not pressed by the compressed gas with enough pressure to move the optical connector 140, the optical connector moving section 520 causes the optical connector 140 to move away from the optical interface 14, thereby forming a space in which the optical signal detecting section 170 is arranged.

Figure 10:
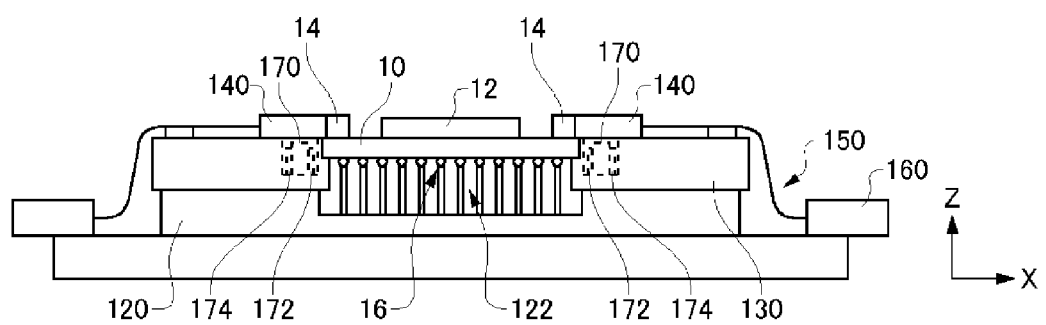
FIG. 10 shows a state in which the optical connector 140 according to the present embodiment is connected to the optical interface 14 of the module under test 10.

When the cylinder 522 is pressed by the compressed gas with enough pressure to move the optical connector 140, the optical connector moving section 520 can move the optical connector 140 toward the optical interface 14. FIG. 10 shows a state in which the optical connector 140 according to the present embodiment is connected to the optical interface 14 of the module under test 10.

Figure 11:
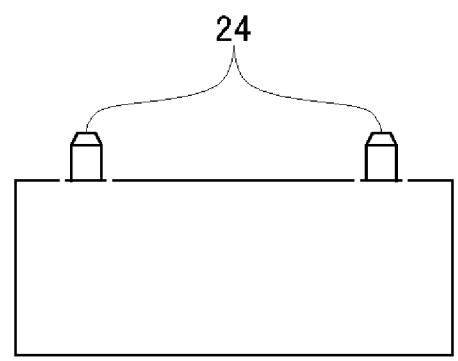
FIG. 11 is a top and side view of the optical interface 14 including the module under test 10, according to the present embodiment.
Figure 11:
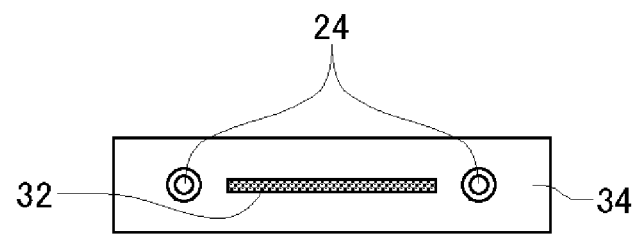
Figure 12:
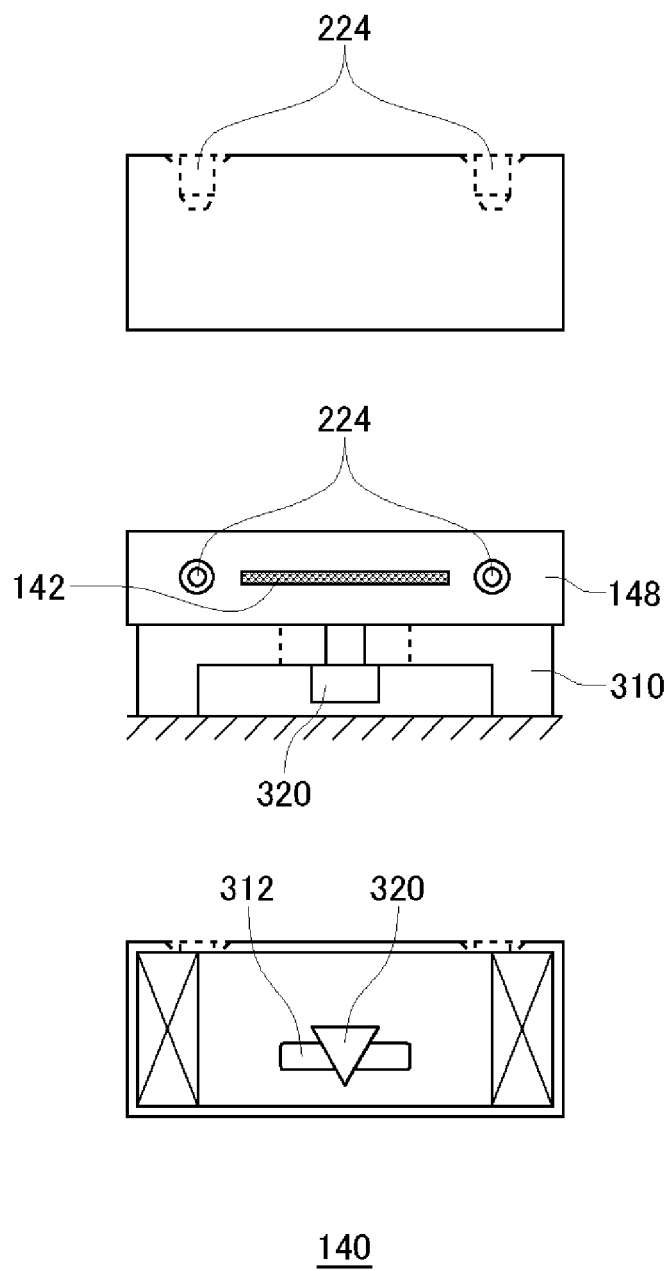
FIG. 12 is a three-surface view of the optical connector 140 according to the present embodiment.

The above embodiment describes an example in which the optical connector 140 is connected to the optical interface 14 by being moved toward the optical interface 14. Here, the optical connector 140 may include a mechanism that, even when there is misalignment between the optical connector 140 and the optical interface 14, can connect the optical connector 140 to the optical interface 14 by moving the optical connector 140 toward the optical interface 14. FIG. 11 is a top and side view of the optical interface 14 including the module under test 10, according to the present embodiment. FIG. 12 is a three-surface view of the optical connector 140 according to the present embodiment.

The optical interface 14 includes guide pins 24, an optical signal input/output section 32, and a device-side plug section 34. The optical interface 14 of this example may form an optical connector, and the guide pins 24 serve as guides when engaging with a corresponding connector. The optical signal input/output section 32 may be formed by exposing one end surface of each of one or more optical waveguides. Here, the end surfaces of the optical waveguides may be processed to be curved, or may instead be processed to be flat and inclined at a predetermined angle. The device-side plug section 34 surrounds the guide pins 24 and the optical signal input/output section 32, and engages with the optical connector 140

The optical connector 140 is held by the device mounting section 130. The optical connector 140 may hold the device mounting section 130 with a space therebetween that allows for pivoting around a central axis that is perpendicular to the device mounting surface of the device mounting section 130. The optical connector 140 may hold the device mounting section 130 with a space therebetween that allows movement in a lateral direction that is perpendicular to the direction in which optical signals progress on the device mounting surface.

The optical connector 140 includes an optical signal input/output section 142, guide holes 224, a connector-side plug section 148, a connector board 310, and a protrusion 320. The optical signal input/output section 142 may be formed by exposing one end of each of a plurality of optical transmission paths 150, and may form an optical connection by having the end surfaces of the optical transmission paths 150 physically contact the corresponding end surfaces of the optical waveguides of the optical signal input/output section 32.

The guide holes 224 are formed to correspond to the guide pins 24, and when the optical connector 140 moves to the optical interface 14 such that the guide pins 24 are inserted in the guide holes 224, the optical connector 140 and the optical interface 14 are engaged. The connector-side plug section 148 surrounds the guide holes 224 and the optical transmission path, and engages with the device-side plug section 34.

The connector board 310 holds the connector-side plug section 148 with a space therebetween. The connector board 310 is held by the cylinder 522 and may move in one direction on the device mounting section 130 while holding the connector-side plug section 148. In this way, the optical connector 140 moves in the direction of the optical interface 14.

The connector board 310 has a grooved shape, and may be U-shaped when viewed from the side. The connector board 310 has a protrusion 320 within the grooved shape. The protrusion 320 is connected to the connector-side plug section 148 through the spacing hole 312 of the connector board 310, and held by the connector board 310 with space allowing the connector-side plug section 148 to rotate and move left and right.

Figure 13:
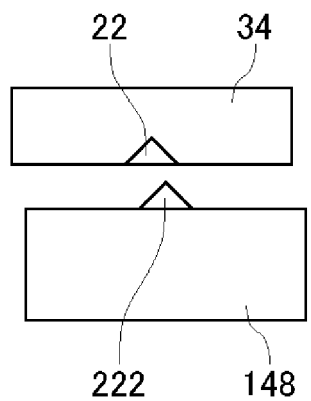
FIG. 13 is a top view of the device-side plug section 34 of the optical interface 14 and the connector-side plug section 148 according to the present embodiment.

The optical interface 14 and the optical connector 140 include a position adjustment mechanism that, when the device-side plug section 34 and the connector-side plug section 148 optically connect to the optical interface 14 and optical connector 140, adjusts the relative positions of the device-side plug section 34 and the connector-side plug section 148. FIG. 13 is a top view of the device-side plug section 34 of the optical interface 14 and the connector-side plug section 148 according to the present embodiment. One of the device-side plug section 34 and the connector-side plug section 148 includes a notch 22, and the other includes a protrusion 222 that engages with the notch.

In the example of the drawing, the device-side plug section 34 includes the notch 22 and the connector-side plug section 148 includes the protrusion 222. Here, as an example, the notch 22 is a V-shaped groove and the protrusion 222 is a mountain-shaped protrusion. For example, in a state where the module under test 10 is positioned, there may be skew in the positional relationship between the optical connector 140 and the optical interface 14.

In such a case, if the skew is within a range that still enables the protrusion 222 and the notch 22 to engage, the optical connector 140 moves in the direction of the optical interface 14 such that the protrusion 222 engages with the notch 22, thereby causing the connector-side plug section 148 to be adjusted to have the correct position relative to the device-side plug section 34. In this way, by engaging the connector-side plug section 148 with the device-side plug section 34, the device interface apparatus 100 can optically connect the optical connector 140 to the optical interface 14.

As described above, the device interface apparatus 100 according to the present embodiment can use the process flow shown in FIG. 3 to sequentially perform the steps of mounting and positioning the module under test 10, electrically connecting to the module under test 10, checking operation of the module under test 10, checking operation of the test apparatus, and optically connecting to the module under test 10. In this way, the device interface apparatus 100 according to the present embodiment can easily perform the optical connection with the module under test 10 including an optical interface.

Furthermore, the device interface apparatus 100 can check the optical output operation of the module under test 10 before optically connecting to the module under test 10. The device interface apparatus 100 can measure connection loss of the optical connector 140 for each connection with the module under test 10, and therefore can easily know the degradation over time and the fluctuation of the connection loss relative to the number of connections, for example.

Figure 14:
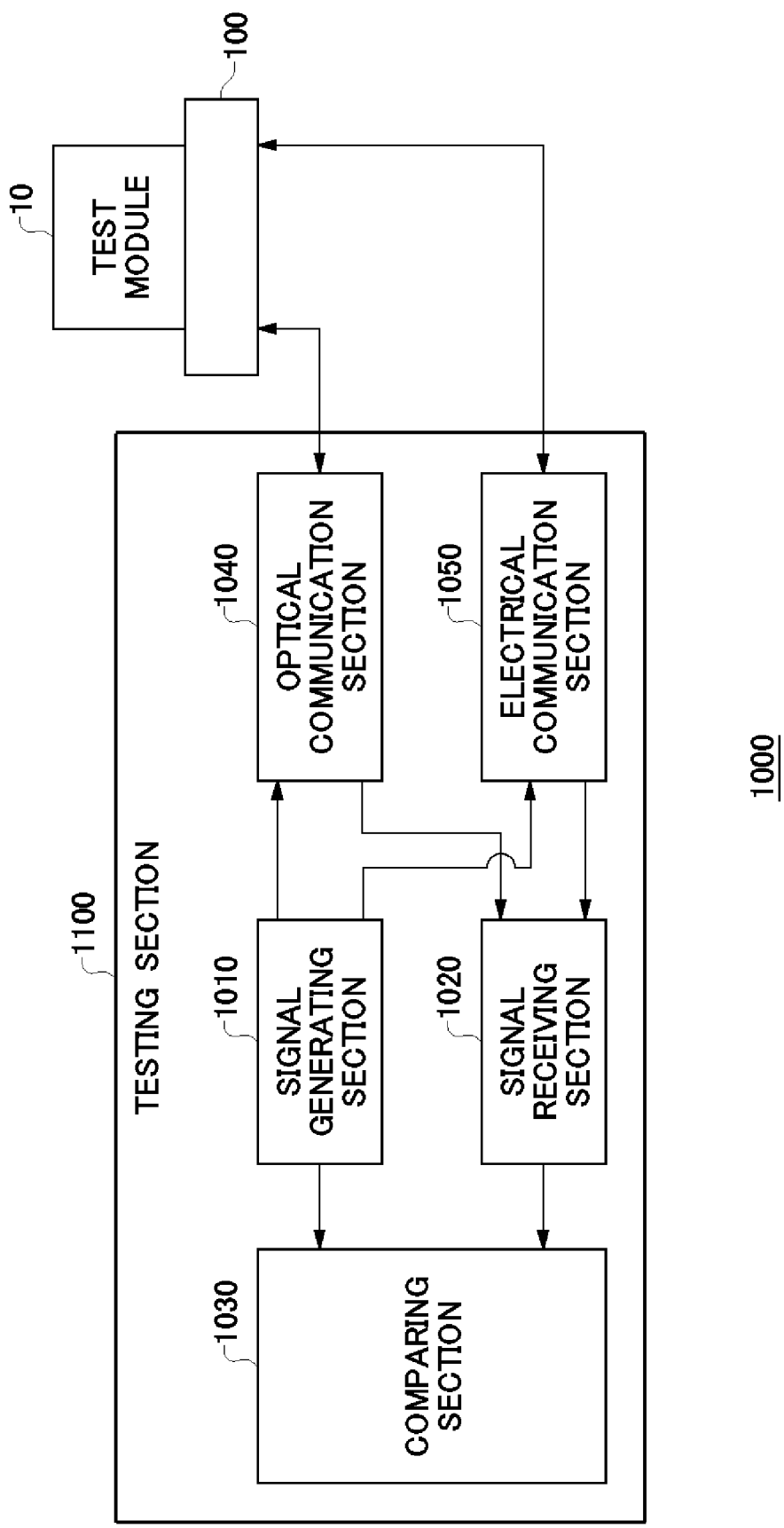
FIG. 14 shows an exemplary configuration of the test apparatus 1000 according to the present embodiment, along with the module under test 10.

FIG. 14 shows an exemplary configuration of the test apparatus 1000 according to the present embodiment, along with the module under test 10. The test apparatus 1000 tests the module under test including the optical interface. The test apparatus 1000 supplies the module under test 10 with a test signal based on a test pattern for testing the module under test 10, and determines pass/fail of the module under test 10 based on an output signal that is output by the module under test 10 in response to the test signal. The test signal supplied to the module under test 10 by the test apparatus 1000 may be an electrical signal and/or optical signal, and the output signal output by the module under test 10 may also be an electrical signal and/or optical signal.

The test apparatus 1000 includes the device interface apparatus 100 and a test section 1100. The device interface apparatus 100 is the device interface apparatus according to the embodiment described in FIGS. 1 to 13, and the module under test 10 is mounted thereon to form an electrical connection and an optical connection between the device interface apparatus 100 and the module under test 10. The test section 1100 is connected to the module under test 10 via the device interface apparatus 100, and tests the module under test 10 by supplying the module under test 10 with a test signal. The test section 1100 includes a signal generating section 1010, a signal receiving section 1020, a comparing section 1030, an optical communication section 1040, and an electrical communication section 1050.

The signal generating section 1010 generates a plurality of test signals to be supplied to the module under test 10, according to a test program. When supplying optical test signals to the module under test 10, the signal generating section 1010 transmits the test signals to the optical communication section 1040. The optical communication section 1040 supplies the module under test 10 with optical test signals obtained by performing electro-optical conversion on the received test signals.

When supplying the module under test 10 with electrical test signals, the signal generating section 1010 transmits the test signals to the electrical communication section 1050. The electrical communication section 1050 supplies the module under test 10 with the received test signals. The signal generating section 1010 may generate an expected value of the response signal that is output by the module under test 10 in response to the test signals, and transmit the expected value to the comparing section 1030.

Upon receiving an optical signal output by the module under test 10 in response to an electrical or optical test signal, the optical communication section 1040 transmits a response signal obtained by performing photoelectric conversion on the optical response signal to the signal receiving section 1020. Furthermore, upon receiving an electrical signal output by the module under test 10 in response to an electrical or optical test signal, the electrical communication section 1050 transmits the received response signal to the signal receiving section 1020. The signal receiving section 1020 may transmit the received response signal to the comparing section 1030. The signal receiving section 1020 may record the received response signal in a storage device, for example.

The comparing section 1030 compares the expected value received from the signal generating section 1010 to the response signal received from the signal receiving section 1020. The test apparatus 1000 may determine pass/fail of the module under test 10 based on the comparison result of the comparing section 1030. In this way, the test apparatus 1000 can perform testing by exchanging electrical signals and optical signals with the module under test 10 including the optical interface.

The test apparatus 1000 can exchange test signals and response signals with the module under test 10 at high speed, by transmitting high frequency signals of hundreds of MHz or more, for example, as optical signals, despite such high frequency signals being difficult to transmit as electrical signals. In this way, the test apparatus 1000 can realize testing of the module under test 10 while operating at the actual operating speed.

The test apparatus 1000 can also perform testing by transmitting a wavelength multiplexed optical signal to the module under test 10. In this case, for example, the optical communication section 1040 receives a plurality of electrical signals from the signal generating section 1010, performs electro-optical conversion to convert each electrical signal into an optical signal with a corresponding wavelength, performs multiplexing, and then transmits the resulting wavelength multiplexed optical signal to the module under test 10.

The test section 1100 of the test apparatus 1000 in the present embodiment is an example that includes an optical communication section 1040 and exchanges optical signals with the device interface apparatus 100. Instead, the optical communication section 1040 may be provided to the substrate 110 of the device interface apparatus 100. In this way, by exchanging electrical signals with the device interface apparatus 100, the test section 1100 can exchange electrical signals and optical signals between the device interface apparatus 100 and the module under test 10, and the role of the test section 1100 can be realized by a portion of a common test apparatus, for example.

Figure 15:
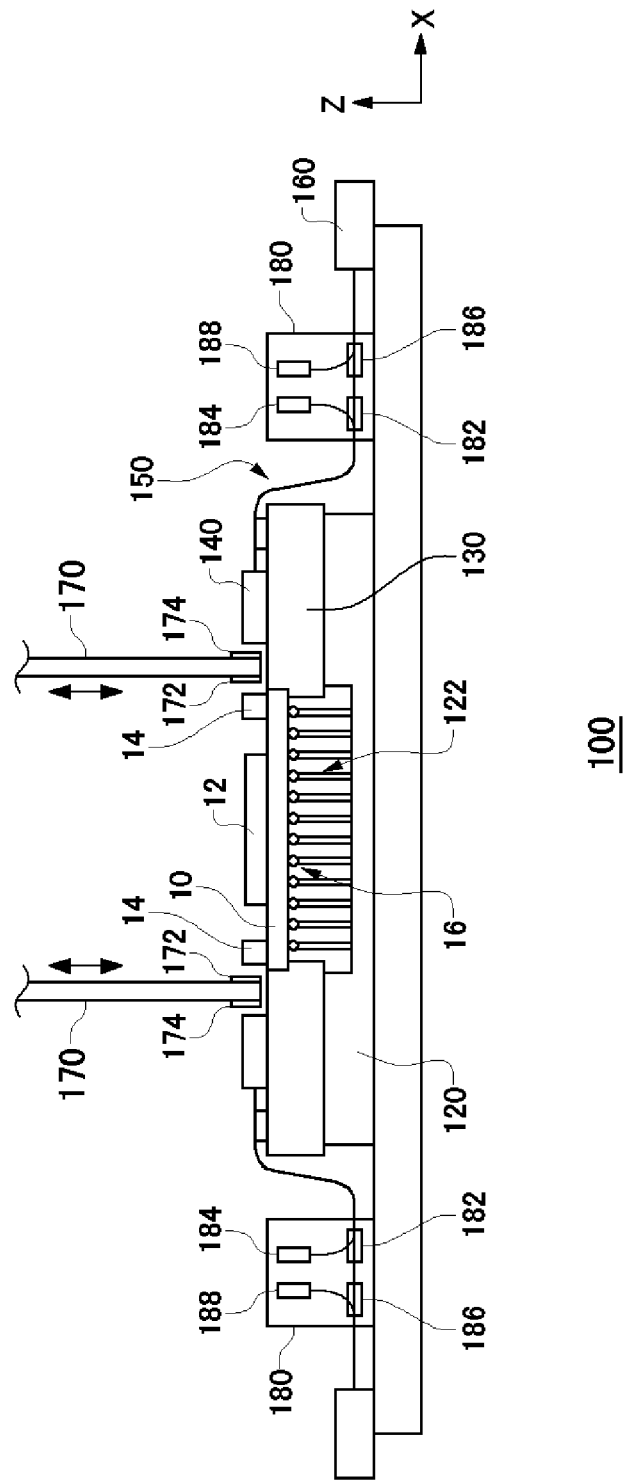
FIG. 15 shows a modification of the device interface apparatus 100 according to the present embodiment, along with the module under test 10.

FIG. 15 shows a modification of the device interface apparatus 100 according to the present embodiment, along with the module under test 10. In the device interface apparatus 100 of the present modification, components that are substantially the same as those of the device interface apparatus 100 according to the embodiment shown in FIG. 2 are given the same reference numerals, and redundant descriptions are omitted. The device interface apparatus 100 includes an optical intensity measuring section 180.

The optical intensity measuring section 180 measures the intensity of an optical signal, by detecting a portion of the optical signal input to the optical transmission path 150 from the optical interface 14 through the optical connector 140. The optical intensity measuring section 180 includes a branching coupler 182 that branches a portion of the light transmitted by the optical transmission path 150 from the module under test 10 toward the optical port 160, and a photodetector 184 that detects a portion of the branched light.

The photodetector 184 measures the intensity of the light transmitted in the optical transmission path 150, according to the branching ratio of the branching coupler 182 and the intensity of the detected light. In a case where the intensity of the detected light is 10 μW and the branching ratio of the branching coupler 182 is 100:1, for example, the photodetector 184 measures the intensity of the light transmitted in the optical transmission path 150 to be substantially 1 mW.

In this way, the device interface apparatus 100 can measure the intensity of the light transmitted in the optical transmission path 150, and can therefore check the intensity of the optical signal actually input to the optical port 160 from the module under test 10. Furthermore, the device interface apparatus 100 can measure the intensity of the optical signal output from the module under test 10 using the optical signal detecting section 170 and the optical intensity measuring section 180, and can therefore measure the optical transmission loss caused by the optical connector 140 in the optical port 160 direction by comparing the two measurement results.

The optical intensity measuring section further measures the intensity of the optical signal output to the optical interface 14 by detecting a portion of the optical signal output to the optical interface 14 from the optical transmission path 150 via the optical connector 140. For example, the optical intensity measuring section 180 includes a branching coupler 186 that branches a portion of the light transmitted by the optical transmission path 150 from the optical port 160 in the direction of the module under test 10, and a photodetector 188 that detects a portion of the branched light.

The photodetector 188 measures the intensity of the light transmitted in the optical transmission path 150, according to the branching ratio of the branching coupler 186 and the intensity of the detected light. In a case where the intensity of the detected light is 20 μW and the branching ratio of the branching coupler 186 is 100:1, for example, the photodetector 188 measures the intensity of the light transmitted in the optical transmission path 150 to be substantially 2 mW.

In this way, the device interface apparatus 100 can measure the intensity of the light transmitted in the optical transmission path 150, and can therefore check the intensity of the optical signal output from the optical port 160 toward the module under test 10. Furthermore, the device interface apparatus 100 can measure the intensity of the optical signal output from the optical connector 140, and can therefore measure the optical transmission loss caused by the optical connector 140 in the module under test 10 direction by comparing the two measurement results.

In the device interface apparatus 100 of the present modification, the optical signal detecting section 170 is formed as a probe, and is inserted between the optical interface 14 and the optical connector 140 from above the device mounting section 130, for example. When the optical interface 14 and the optical connector 140 are being connected, the optical signal detecting section 170 is withdrawn to be above the device mounting section 130. In this way, the device interface apparatus 100 can be formed without the portion of the device mounting section 130 housing the optical signal detecting section 170.

The present modification is an example in which the photodetector 184 and the photodetector 188 branch a portion of the light transmitted by the optical transmission path 150 and detect a portion of the branched light. Instead, the photodetector 184 and the photodetector 188 may be arranged in a direction substantially perpendicular to the transmission direction of the optical transmission path 150, and may measure the intensity of the transmitted light by detecting the light that leaks from the optical transmission path 150.

FIG. 16 shows a modification of the optical signal detecting section 170 according to the present embodiment. In FIG. 16, components that are substantially the same as those of the device interface apparatus 100 according to the embodiment shown in FIGS. 1 and 2 are given the same reference numerals, and redundant descriptions are omitted. The optical signal detecting section 170 of the present modification further includes a mirror section 176 that reflects an incident optical signal at a predetermined angle.

The mirror section 176 reflects the optical signal output from at least one of the optical interface 14 and the optical connector 140 in a direction of the optical signal detecting section 170 to detect the optical signal. FIG. 16 shows an example of the optical signal detecting section 170 in which the photoelectric converter 172 and the photoelectric converter 174 corresponding respectively to the optical interface 14 and the optical connector 140 are arranged facing the direction of the device mounting section 130. The optical signal detecting section 170 is arranged above the device mounting section 130.

The mirror section 176 reflects the optical signal from the optical interface 14, which is output substantially parallel to the device mounting surface of the device mounting section 130, toward the corresponding photoelectric converter 172. Furthermore, the mirror section 176 reflects the optical signal from the optical connector 140, which is output substantially parallel to the device mounting surface of the device mounting section 130, toward the corresponding photoelectric converter 174. FIG. 16 shows an example in which the mirror section 176 is formed integrally as a prism having a triangular cross section, but instead, the mirror section 176 may have a plurality of independent mirrors corresponding respectively to the optical interface 14 and the optical connector 140.

In the optical signal detecting section 170 of the present modification, the mirror section 176 is moved to be housed in the device mounting section 130. Specifically, the device interface apparatus 100 includes a moving section that moves the mirror section 176 to the optical axis of the optical signal, so that the optical signal detecting section 170 detects the optical signal output from at least one of the optical interface 14 and the optical connector 140.

In other words, FIG. 16 shows an example in which the mirror section 176 has been moved to the optical axis of the optical signals output from the optical interface 14 and the optical connector 140, by the moving section. When connecting the optical interface 14 and the optical connector 140, the moving section moves the mirror section 176 away from the optical axis of the optical signal to be housed in the device mounting section 130. In this way, by moving a portion of the optical signal detecting section 170, the device interface apparatus 100 can detect the optical signal output from at least one of the optical interface 14 and the optical connector 140 before connecting the optical interface 14 and the optical connector 140.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A device interface apparatus on which is mounted a device under test having an optical interface, the device interface apparatus comprising:
    a device mounting section on which the device under test is mounted;
    an optical connector that is connected to the optical interface of the device under test; and
    an optical signal detecting section that detects an optical signal output from at least one of the optical interface and the optical connector, before the optical interface of the device under test mounted on the device mounting section is connected to the optical connector.

2. The device interface apparatus according to claim 1, wherein
    the optical signal detecting section includes a photoelectric converter that converts an optical signal into an electrical signal, and
    the device interface apparatus comprises a moving section that moves the photoelectric converter to an optical axis of the optical signal, so that the optical signal detecting section detects the optical signal output from at least one of the optical interface and the optical connector.

3. The device interface apparatus according to claim 2, wherein when connecting the optical interface and the optical connector, the moving section moves the photoelectric converter away from the optical axis of the optical signal.

4. The device interface apparatus according to claim 2, wherein the optical signal detecting section includes:
   a first surface that faces an emission surface from which the optical interface outputs an optical signal and that has provided thereon a photoelectric converter that converts the optical signal output by the optical interface into an electrical signal; and
   a second surface that faces an emission surface from which the optical connector outputs an optical signal and that has provided thereon a photoelectric converter that converts the optical signal output by the optical connector into an electrical signal.

5. The device interface apparatus according to claim 2, wherein
   the device under test includes a plurality of the optical interfaces,
   the device interface apparatus comprises a plurality of the optical signal detecting sections and a plurality of the optical connectors corresponding to the plurality of optical interfaces and connected respectively to the plurality of optical interfaces, and
   the moving section moves each of the optical signal detecting sections between the corresponding optical interface and the corresponding optical connector.

6. The device interface apparatus according to claim 1, wherein
   the optical interface outputs a plurality of optical signals, and
   the corresponding optical signal detecting section includes a plurality of photoelectric converters that convert the plurality of optical signals respectively into electrical signals.

7. The device interface apparatus according to claim 6, wherein
   the optical connector outputs a plurality of optical signals, and
   the corresponding optical signal detecting section includes a plurality of photoelectric converters that convert the plurality of optical signals respectively into electrical signals.

8. The device interface apparatus according to claim 7, wherein the optical signal detecting section includes:
   a first surface that faces an emission surface from which the corresponding optical interface outputs the plurality of optical signals and that has provided thereon a plurality of photoelectric converters that convert the plurality of optical signals output by the corresponding optical interface into respective electrical signals; and
   a second surface that faces an emission surface from which the corresponding optical connector outputs the plurality of optical signals and that has provided thereon a plurality of photoelectric converters that convert the plurality of optical signals output by the corresponding optical connector into respective electrical signals.

9. The device interface apparatus according to claim 1, wherein
   the optical signal detecting section includes a mirror section that reflects, at a predetermined angle, an optical signal incident thereto, and
   the device interface apparatus comprises a moving section that moves the mirror section to an optical axis of the optical signal, so that the optical signal detecting section detects the optical signal output from at least one of the optical interface and the optical connector.

10. The device interface apparatus according to claim 1, wherein
    the device under test further includes a device-side electrical terminal for exchanging electrical signals with outside, and
    the device interface apparatus comprises a socket section that includes a socket-side electrical terminal connected to the device-side electrical terminal.

11. The device interface apparatus according to claim 10, comprising:
    a substrate having the socket section provided on the top surface thereof, and
    a flexible optical transmission path having one end thereof connected to the optical connector and the other end thereof fixed to the substrate.

12. The device interface apparatus according to claim 11, further comprising:
    an optical intensity measuring section that measures intensity of an optical signal by detecting a portion of the optical signal input to the optical transmission path from the optical interface through the optical connector.

13. The device interface apparatus according to claim 12, wherein
    the optical intensity measuring section further measures intensity of an optical signal output to the optical interface, by detecting a portion of the optical signal output to the optical interface from the optical transmission path through the optical connector.

14. The device interface apparatus according to claim 1, comprising:
    an optical connector moving section that moves the optical connector toward the optical interface to optically connect the optical interface and the optical connector.

15. The device interface apparatus according to claim 14, wherein
    the device under test includes the optical interface facing a side surface of the device under test, and
    the optical connector moving section moves the optical connector toward the optical interface, perpendicular to the side surface of the device under test.

16. A method for testing a device under test including an optical interface, comprising:
    mounting the device under test on the device interface apparatus according to claim 1;
    detecting an optical signal output from the device under test;
    optically connecting the device under test and the device interface apparatus; and
    supplying the device under test with an optical test signal through the device interface apparatus.

17. A test apparatus that tests a device under test including an optical interface, the test apparatus comprising:
    the device interface apparatus according to claim 1, on which the device under test is mounted; and
    a test section that is connected to the device under test via the device interface apparatus and performs testing by supplying the device under test with a test signal.

* * * * *